(12) United States Patent
Heitplatz

(10) Patent No.: US 8,985,310 B2
(45) Date of Patent: Mar. 24, 2015

(54) SORTING CONVEYOR

(75) Inventor: Heino Heitplatz, Drensteinfurt (DE)

(73) Assignee: Beumer GmbH & Co. KG, Beckum (DE)

( * ) Notice: Subject to any disclaimer, the term of this patent is extended or adjusted under 35 U.S.C. 154(b) by 0 days.

(21) Appl. No.: 13/201,608

(22) PCT Filed: Dec. 18, 2009

(86) PCT No.: PCT/DE2009/001785
§ 371 (c)(1), (2), (4) Date: Sep. 14, 2011

(87) PCT Pub. No.: WO2010/091655
PCT Pub. Date: Aug. 19, 2010

(65) Prior Publication Data
US 2012/0012438 A1  Jan. 19, 2012

(30) Foreign Application Priority Data
Feb. 16, 2009  (DE) .......................... 10 2009 009 044

(51) Int. Cl.
*B65G 21/22* (2006.01)
*B65G 17/06* (2006.01)
(Continued)

(52) U.S. Cl.
CPC .............. *B65G 21/22* (2013.01); *B65G 17/066* (2013.01); *B65G 17/385* (2013.01); *B65G 39/20* (2013.01)
USPC ..................... 198/469.1; 198/683; 198/370.04

(58) Field of Classification Search
CPC ....... B65G 21/22; B65G 39/20; B65G 17/066
USPC .............................................. 198/469.1, 683
See application file for complete search history.

(56) References Cited

U.S. PATENT DOCUMENTS 3,114,332 A    12/1963 Bacon et al.
3,648,617 A *  3/1972 Metzner et al. .................. 104/94
(Continued)

FOREIGN PATENT DOCUMENTS

DE      4090308       3/1992
DE      202 05 395    9/2002
(Continued)

OTHER PUBLICATIONS
U.S. Appl. No. 13/003,289, Non-Final Office Action dated Dec. 2, 2013 (8 pages).
(Continued)

*Primary Examiner* — Gene Crawford
*Assistant Examiner* — Thomas Randazzo
(74) *Attorney, Agent, or Firm* — Ganz Pollard, LLC

(57) ABSTRACT

The invention relates to a sorting feeder having a series of travelers (2) joined together by a hinge, and guidable and displaceable along a track (4), each comprising a guide unit (8) and a supporting unit (10) joined thereto by a hinge, wherein each guide unit (8) comprises a support roller (16) on each side at matching longitudinal positions for interacting with the track (4), and wherein each support roller (16) is associated with two guide rollers (18), of which a first is disposed at a first longitudinal position at a distance ahead of the support roller (16) and a second is disposed at a second longitudinal position at a distance behind the support roller (16), wherein a coupling hinge (12) pivotable about a pivot axis (12a) aligned perpendicular to a track plane is disposed between the guide unit (8) and the support unit (10) of each traveler (2) and a connecting hinge (26) rotatable in every direction is disposed between adjacent travelers (2), and wherein the connecting hinge (26) and the coupling hinge (12) each are disposed at longitudinal positions outside of an area between the first and the second longitudinal position of the guide rollers (18).

46 Claims, 7 Drawing Sheets

Figure 1:
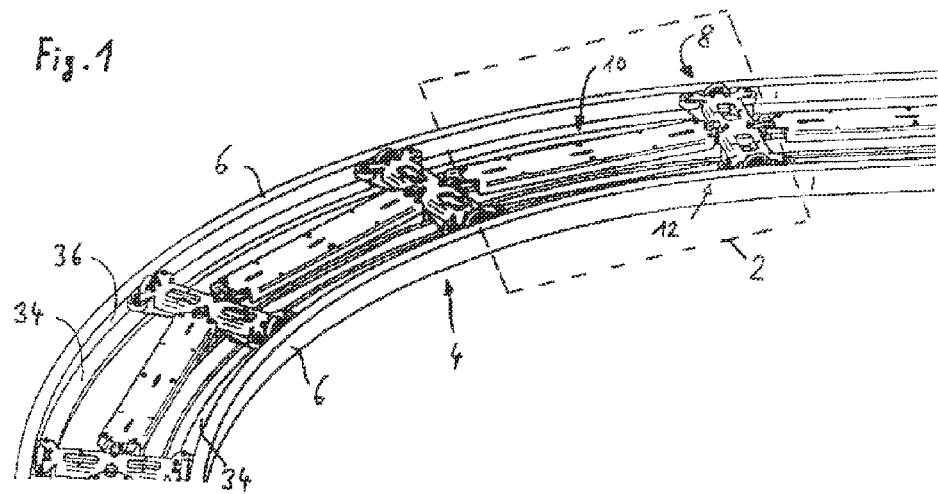

(51) Int. Cl.
  *B65G 17/38* (2006.01)
  *B65G 39/20* (2006.01)

(56) References Cited

U.S. PATENT DOCUMENTS

| | | | |
|---|---|---|---|
| 3,880,276 A | | 4/1975 | Willett, III |
| 4,454,821 A | * | 6/1984 | Dickhart, III ............ 105/4.4 |
| 4,718,351 A | * | 1/1988 | Engle ...................... 105/4.3 |
| 4,726,456 A | | 2/1988 | Hogsett |
| 4,729,466 A | | 3/1988 | Bollier et al. |
| 4,793,473 A | * | 12/1988 | Gilgore et al. ............ 198/845 |
| 4,951,801 A | * | 8/1990 | Mraz ...................... 198/303 |
| 5,190,134 A | * | 3/1993 | Mraz ...................... 198/303 |
| 5,267,514 A | * | 12/1993 | Staehs et al. ............ 104/246 |
| 5,611,418 A | | 3/1997 | Helmstetter |
| 5,690,209 A | * | 11/1997 | Kofoed ................ 198/370.06 |
| 5,839,567 A | * | 11/1998 | Kyotani et al. ............ 198/683 |
| 5,901,830 A | | 5/1999 | Kalm et al. |
| 6,082,522 A | * | 7/2000 | Polling ................ 198/370.04 |
| 6,253,901 B1 | | 7/2001 | Hintz et al. |
| 6,736,254 B1 | | 5/2004 | Fortenbery et al. |
| 7,166,814 B2 | | 1/2007 | Nakanishi et al. |
| 2004/0016679 A1 | | 1/2004 | Schieleit |
| 2004/0216985 A1 | * | 11/2004 | Nishihara et al. ......... 198/469.1 |
| 2010/0314223 A1 | * | 12/2010 | Franz ...................... 198/802 |
| 2011/0108392 A1 | | 5/2011 | Polling |

FOREIGN PATENT DOCUMENTS

| | | |
|---|---|---|
| EP | 700844 A2 | 3/1996 |
| EP | 1338346 A2 | 8/2003 |
| EP | 1352858 A2 | 10/2003 |
| SU | 1489855 A1 | 6/1989 |
| WO | WO 90/09944 | 9/1990 |
| WO | 9103324 A1 | 3/1991 |
| WO | 9831617 A1 | 7/1998 |
| WO | WO9847797 | 10/1998 |
| WO | 9855379 A1 | 12/1998 |

OTHER PUBLICATIONS

U.S. Appl. No. 13/003,289, Final Office Action dated Sep. 10, 2013 (9 pages).
PCT Search Report and Written Opinion dated Nov. 5, 2009, in International Patent Application No. PCT/DE2009/000737; accompanied by English-Language Translation; 15 pages.
PCT Search Report and Written Opinion dated Mar. 12, 2012, in International Patent Application No. PCT/DE2011/001874, accompanied by English-Language Translation; 19 pages.
Office Action dated Apr. 12, 2013, in U.S. Appl. No. 13/003,289; 8 pages.
International Search Report and Written Opinion for International Application No. PCT/DE2009/001785, dated Jun. 15, 2010 (German language, 7 pages total). English Translation of the Written Opinion of the International Searching Authority for International Application No. PCT/DE2009/001785, dated Jun. 15, 2010 (7 pages total).
English Translation of the International Preliminary Report on Patentability for International Application No. PCT/DE2009/001785, dated Aug. 16, 2011 (1 page total).
German Examination Report for German Patent Application 10 2009 009 044.4-22 dated Oct. 8, 2009, 4 pages.

* cited by examiner

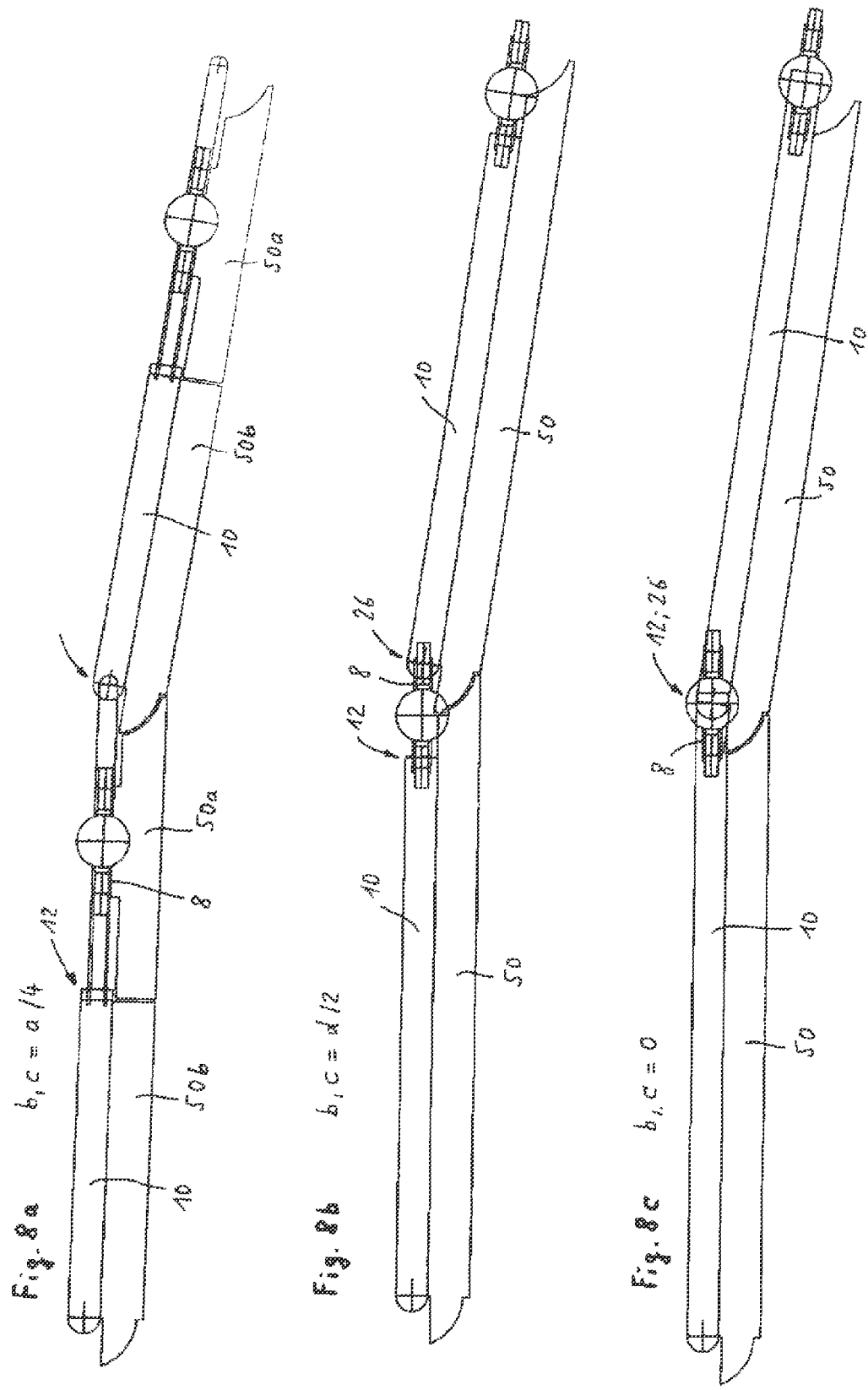

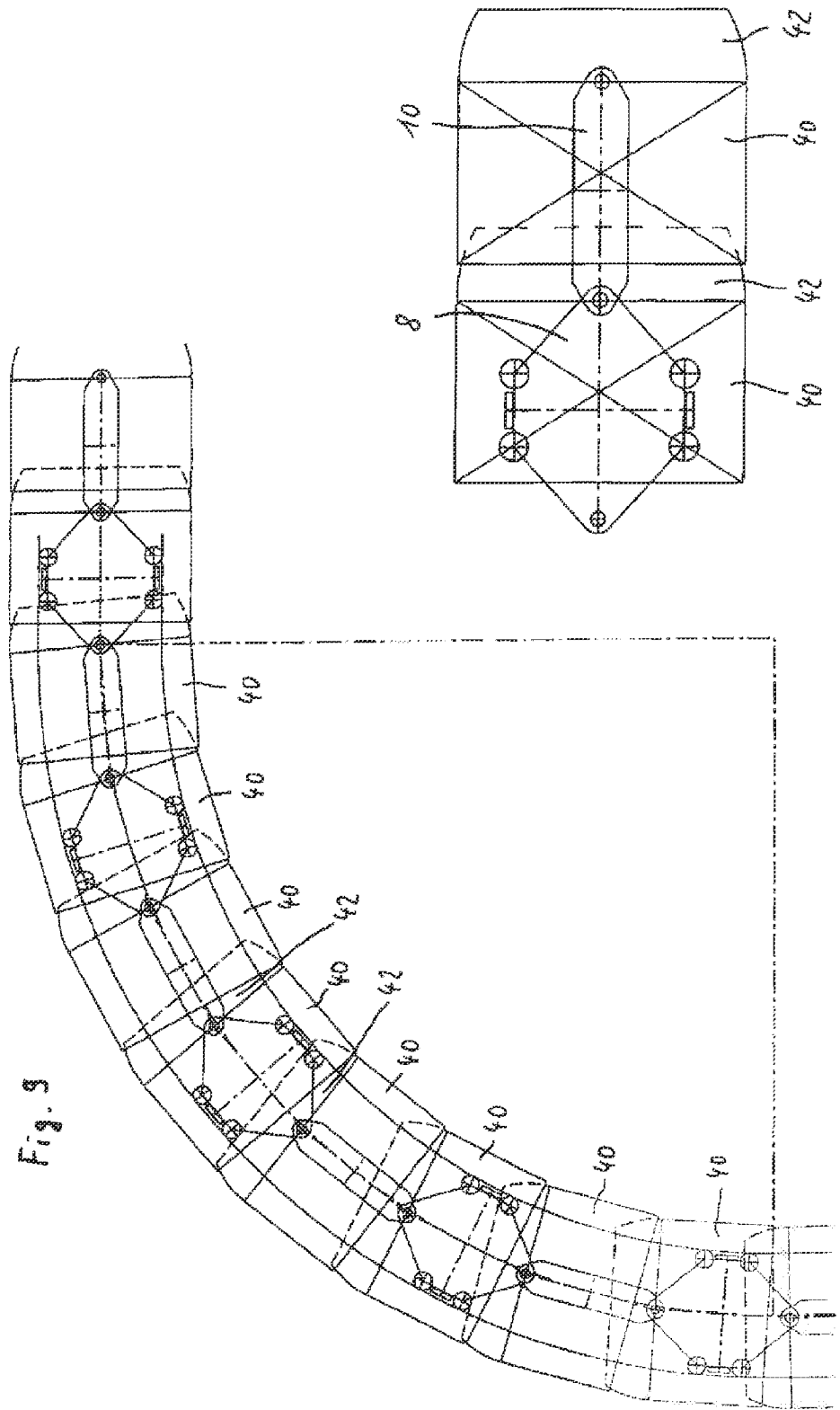

SORTING CONVEYOR

Sorting conveyors in the form of sorter chains are usually designed as chains of cars, where the cars consist of a frame to which are attached, on the one hand, idlers for vertically dissipating weight forces and, on the other hand, guide rollers for horizontally dissipating guide forces in stationary running rails. The frame also supports one or more load-bearing members, such as mechanically or electrically actuated tilting members or transverse rib members. In addition, the frame is usually employed to introduce drive forces. The cars themselves are joined together by links at their ends to form an endless chain. An arrangement of this kind is known from DE 40 90 308.

With this design, the guide rollers and idlers are as a rule preferably arranged, when seen in the direction of conveyance, at the front or rear end of the car, symmetrically to the centre line of the sorting conveyor.

The horizontal guidance of the car in the running rail is ensured by the guide rollers, the axes of which are aligned perpendicularly to the plane of the bottom. The load-bearing idlers are supported on horizontal running surfaces of the running rail, which is usually C-shaped in cross-section, so that there is only a small air gap between the upper leg of the C-profile and the idler, thus securing it against lifting off. It is convenient for the idlers each to be mounted on an additional component, which is in each case arranged so as to be pivotable on the frame about a vertical axis, so that the idler is arranged trailing relative to the vertical swivelling axis. When travelling round bends, the idler aligns itself in such a way that its axis of rotation runs through the centre point of the horizontal curve, so that increased kinetic resistance of the chain of cars resulting from excessive friction between the idlers and the running rail is avoided.

One disadvantage of this design is that, because of the relatively long car or frames, a pronounced polygon effect arises in bends, which leads to swelling tensile forces in time with the succession of cars and therefore encourages the development of noise and increased wear.

A further disadvantage occurs whenever the connecting lings between the cars are not on the same height as the guide rollers, because in that case the tensile forces in the chain cause lateral forces, which can lead to moments of tilt and may cause the idlers on the outside of the bend to lift off briefly. When the idler strikes the lift-off guard in the form of the upper leg of the C-profile forming the running rail, the idler changes its direction of rotation, which leads to more noise and increased wear on the idlers and running rails.

A further possible negative effect of the known sorting conveyor is that when travelling round bends, the car twists so much because of the polygon effect that the car, which is otherwise guided tightly by the guide rollers, has greater horizontal play, and this is undesirable, because the opening of the rocker bearing link can cause the chain tension originally set to relax until there may even be a slack chain, with the possible consequence of undefined movements of the car in the bends.

The play referred to, in combination with a contact-free energy transmission from the stationary running rail to the moving car, for example by means of the induction principle, especially by means of linear motor technology, means that the car no longer has exact horizontal guidance, so that there is a further disadvantage in that the energy transmitted and also the power that can be transmitted are reduced.

Finally, the fact that the idlers are attached as trailing end runners means that whenever there are any backward movements on the part of the sorting conveyor, the orientation of the idlers is undefined, which already causes them to swing out uncontrolledly even after a short backward movement. Because of this misalignment, the kinetic resistance increases many times over. Sorting conveyors designed with an arrangement of this kind therefore have a fixed direction of conveyance and are not suitable for reversing operations.

The problem of the invention consists in improving a sorting conveyor with a series of cars linked together in an articulated way, which are guided and capable of travelling along a track, in such a way that the above-mentioned disadvantages no longer arise.

In order to solve this problem, the invention proposes a construction in which the cars in each case have a guide unit and carrier unit linked to it in an articulated way, wherein each guide unit has, in matching longitudinal positions on each side, an idler for co-operating with the track, and wherein each idler has associated with it two guide rollers, a first one of which is disposed in a first longitudinal position spaced apart in front of the respective idler and a second one of which is disposed in a second longitudinal position spaced apart behind the respective idler, wherein between the guide unit and the carrier unit of a car there is disposed a coupling hinge which is pivotable about a swivelling axis aligned perpendicularly to a plane of the track, and between adjacent cars there is disposed a connecting hinge which is rotatable in each direction, and wherein the coupling hinge and the connecting hinge are each disposed in longitudinal positions outside an area between the first and second longitudinal positions of the guide rollers.

In an alternative embodiment, it is contemplated that the connecting hinge and the ball joint are disposed in a matching longitudinal position centrally between the first and second longitudinal positions of the guide rollers.

A further alternative embodiment contemplates that the connecting hinge is disposed in the first or second longitudinal position of the guide rollers and the coupling hinge is disposed in the respective other, second or first, longitudinal position of the guide rollers.

With the first variant mentioned, it can advantageously be ensured that the guide units and the carrier units are identical in length, so that the polygon effect is minimised. This is the case whenever the connecting hinge and the coupling hinge of each guide unit are arranged in longitudinal positions at equal distances in front of and behind the longitudinal position of the idlers and are spaced apart from one another by a first distance, and connecting and coupling hinges of each carrier unit are spaced apart from one another by a distance identical to the first mutual spacing.

In all the variants, it may preferably be contemplated that the idlers of a guide unit are rotateble about a common horizontal axis of rotation. In addition, it is preferably contemplated that each idler is located centrally between two directly adjacent guide rollers. In this way, a first guide roller may be disposed in a first longitudinal position spaced apart in front of a particular idler, and a second guide roller may be disposed spaced apart by the same distance behind that idler.

In addition, it is expedient for the guide rollers to be rotatable about vertical axes of rotation, i.e. parallel to the swivelling axis of the connecting hinge.

It may be expedient for the guide rollers of a guide unit to be disposed spaced apart by a longitudinal distance which is smaller than a transverse spacing of the guide rollers perpendicularly to the direction of conveyance.

It is preferably contemplated that the guide rollers of the guide unit are arranged at the same height as the centre of motion of the connecting hinge. In horizontal bends, this ensures that the lateral forces resulting from the tensile forces in the chain do not lead to a tilting moment acting on the car.

Furthermore, it is preferably contemplated that the guide rollers of a guide unit are arranged at the same height as the axes of rotation of the idlers.

It may be contemplated that the idlers can be driven by motors. Alternatively, it may be contemplated that the guide units and/or the carrier units possess a reaction part for transmitting drive forces by means of a friction wheel or linear drive. The reaction part may take the form of a stator or a drive part of a linear motor, wherein the respective other drive element is disposed in a stationary manner in the area of the track or is formed by the latter.

In this context, it is possible for the reaction parts to take the form of flat components aligned vertically and in the direction of conveyance, the ends of which facing in the direction of conveyance being rounded in the shape of a segment of a circle in the region of a connecting hinge and forming a narrow gap to an adjacent reaction part.

It is expediently contemplated that at least one load-bearing member is disposed on each car. The load-bearing members may be mechanically or electrically actuated tilting members or transverse rib members.

In particular, it may be contemplated that each car is equipped with two load-bearing members, one of which is disposed on the guide unit and one on the carrier unit. The load-bearing members of one car may be of the same size.

Figure 2:
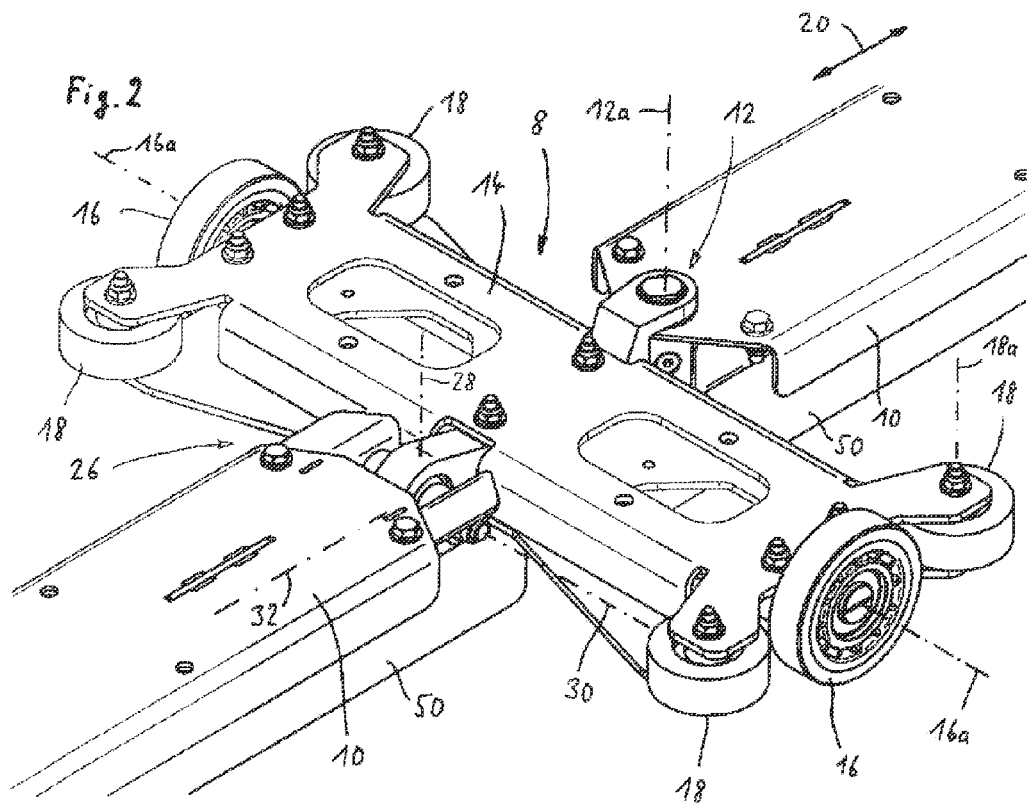
Figure 3:
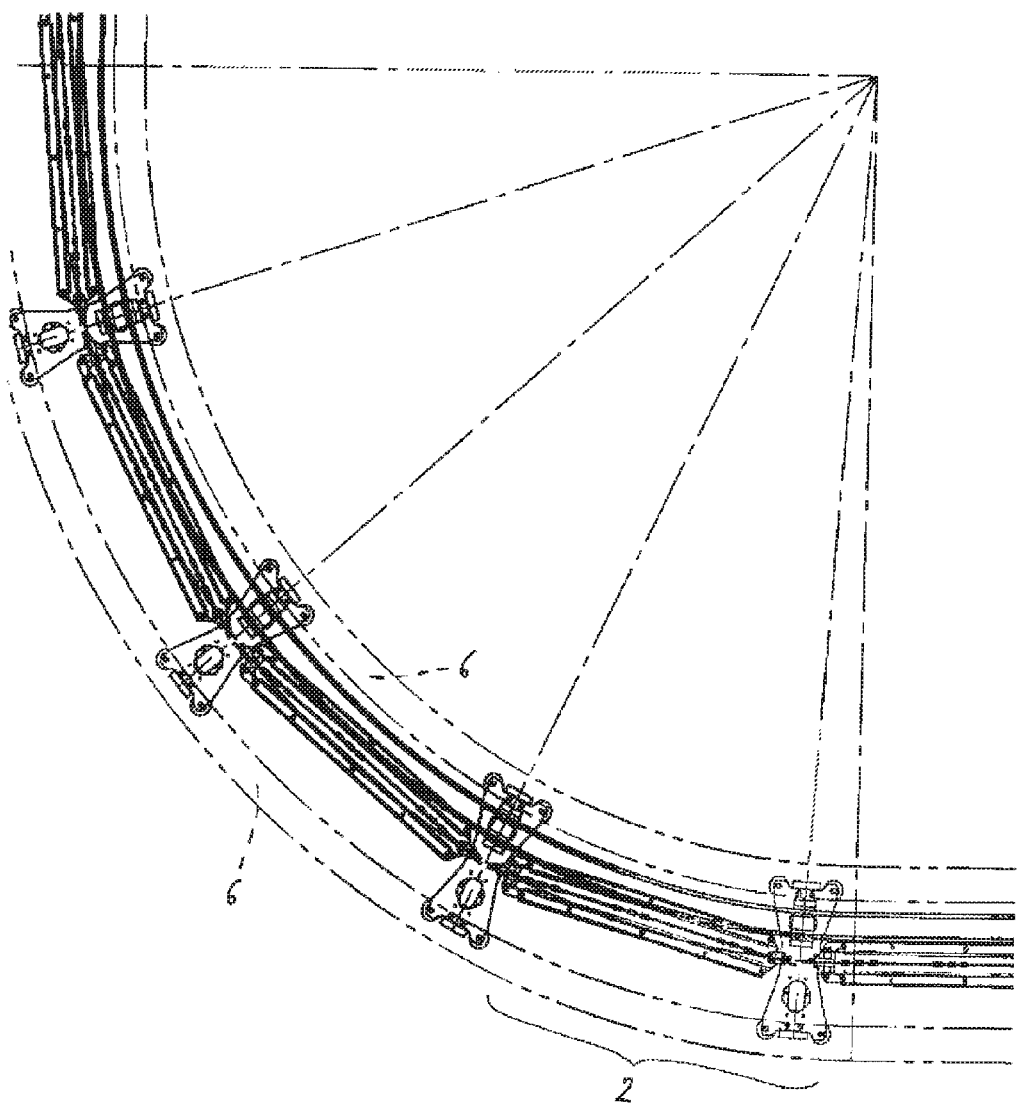
Figure 4:
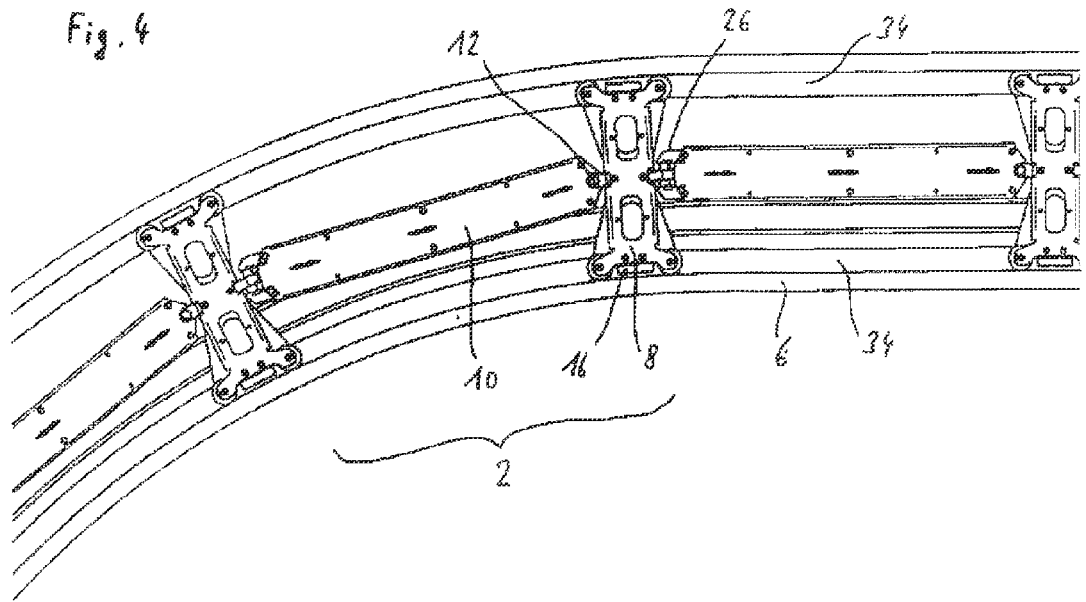
Figure 5:
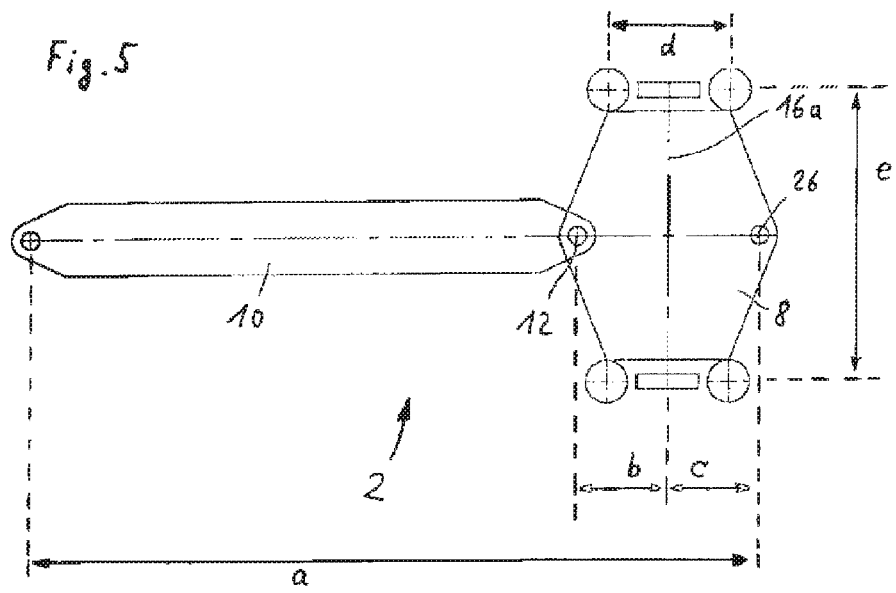
Figure 6A:
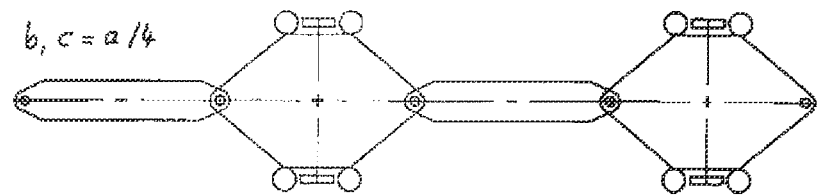
Figure 6B:
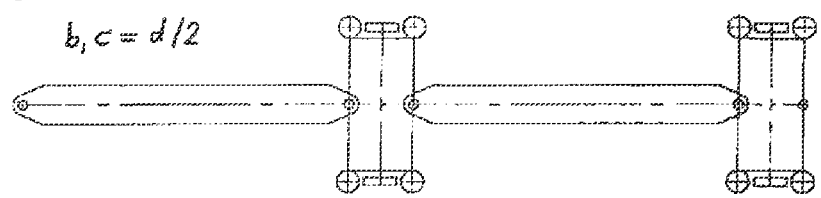
Figure 6C:
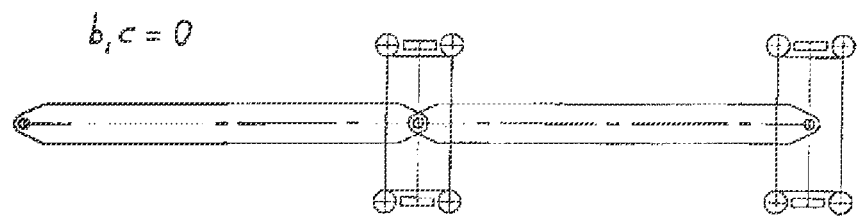
Figure 7:
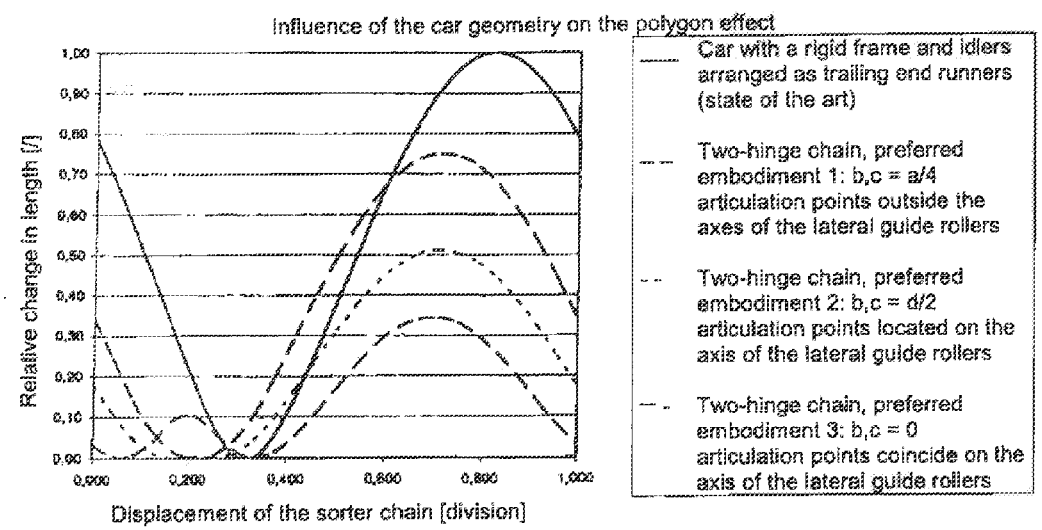

Further advantages and features of the invention will become clear from the following description of preferred embodiments, wherein FIG. 1 shows part of a sorting conveyor in accordance with the invention without any load-bearing members in a perspective view seen obliquely from above, FIG. 2 shows a section of the sorting conveyor from FIG. 1 on an enlarged scale, FIG. 3 shows part of a sorting conveyor in accordance with the invention in a view seen from below, FIG. 4 shows the part of the sorting conveyor from FIG. 3 from below, FIG. 5 shows a car of a sorting conveyor in accordance with the invention in a schematic sketch, FIGS. 6a-c illustrate three different embodiments of the invention, FIG. 7 explains the influence of the car geometry on the polygon effect, FIGS. 8a-c illustrate preferred embodiments of the invention when driving round a vertical bend, FIG. 9 shows a preferred embodiment of the invention according to FIG. 6a with two support members per car in a schematic view seen from above.

Reference is made first to FIGS. 1 to 5, in which the basic features of the invention are illustrated by means of a worked embodiment. The sorting conveyor of the invention consists of a series of cars 2 linked together in an articulated way, which are guided and capable of travelling along a track 4, which is formed in the present case by two running rails 6 laid parallel to one another.

Each car consists of two members linked together in an articulated way, namely a guide unit 8 and a carrier unit 10, which are coupled together by means of a coupling hinge 12. The coupling hinge 12 has a swivelling axis 12a running vertically and thus enables a swivelling movement of the guide unit 8 and carrier unit 10 relative to one another about said swivelling axis 12a (for illustration reasons, FIG. 2 shows a view of FIG. 1 or 4 from the rear in order to be able better to illustrate the coupling hinge described below).

The guide unit 8 consists of a car body 14 aligned transversely to the direction of travel, on each of the outer ends of which are disposed an idler 16 with a horizontal axis of rotation 16a and two guide rollers 18 with a vertical axis of rotation 18a. The axes of rotation 16a of the two running wheels 16 are identical to one another or align with one another, and are orientated perpendicularly to the swivelling axis 12a of the coupling hinge 12. In an alternative embodiment, it is possible for the axes of rotation 16a to be at an angle to one another, i.e. the idlers 16 are arranged to be pointing obliquely inwards or outwards with their axes of rotation disposed in a plane perpendicular to the longitudinal direction or the direction of conveyance 20 of the conveyor.

In one variant, the axes of rotation of the guide rollers 18 can also be arranged at an angle to the vertical, so that the guide rollers are arranged to be pointing obliquely, and here too, in order to avoid excessive friction and to reduce wear, it goes without saying that their axes of rotation should be disposed in a plane orientated perpendicularly to the direction of conveyance 20.

In a preferred embodiment, however, the arrangement is as illustrated, i.e. the idlers have a common axis of rotation 16a, which runs perpendicularly to the swivelling axis 12a and to the axes of rotation 18a of the guide rollers 18, those axes of rotation 18a being parallel to one another.

Every two adjacent cars 2 are linked together in an articulated way by means of a connecting hinge 26. The connecting hinge 26 takes the form of a universal joint or rocker bearing and makes it possible for the members linked in this way, namely the guide unit 8 of one car and the carrier unit 10 of an adjacent car, to twist in all directions (vertical axis 28, transverse axis 30 and longitudinal axis 32). In this way, the cars can run with no difficulty not only horizontally, but also vertically round bends and helical bends (spiral bends).

As can be seen in FIG. 1 in particular, the running rails 6 each have a bearing track 34 on which the idlers 16 roll, and a guide track 36 perpendicular thereto, along which the guide rollers 18 run. Upper means providing security against lifting off arranged opposite the bearing tracks 34 and a fixed distance apart from them are not shown, for the sake of simplicity. The four guide rollers 18 thus ensure that the guide unit 8, which is guided closely between the guide rails 6, is always aligned in such a way that the idlers 16 are also guided ideally in the direction of conveyance, even in bends. The axes of rotation 16a of the idlers 16, which are arranged in a line, are always aligned through the centre point of the curve, as is also shown in FIG. 3. Since the idlers designed as trailing end runners and guided so as to be swivellably movable, as in the state of the art, are dispensed with, the idlers can be guided along a narrowly delimited path, so that the bearing tracks 34 can be made correspondingly narrow.

The bearing tracks 34 define a track plane, to which the swivelling axis 12a and the axes of rotation 18a run perpendicular and the axis of rotation 16a runs parallel.

Since the idlers are fixed firmly to the guide unit, reversing operation of the sorting conveyor is possible with no difficulty.

With reference to FIGS. 5 and 6, three preferred variants of an embodiment of the invention will be explained below. FIG. 5 shows a car 2, consisting of a guide unit 8 and a carrier unit 10, which are coupled together at the coupling hinge 12. Opposite the coupling hinge 12, the guide unit 8 has a connecting hinge 26 for co-operating with the carrier unit of a further guide car. In the stretched state in accordance with FIG. 5, the corresponding articulation points of the connecting hinge 26 and the carrier unit 10 are spaced mutually apart by a distance a, which corresponds to the length of a car unit.

The coupling hinge 12 is arranged spaced apart by a coupling hinge distance b from the common axis of rotation 16a of the idlers 16, and the connecting hinge 26 is a connecting hinge distance c from the axis of rotation 16a. The guide rollers 18 are arranged spaced apart from one another by a guide roller distance d in the longitudinal direction, and, seen across the longitudinal direction or direction of conveyance 20, have a mutual axis transverse spacing e.

FIG. 6 shows three preferred variants of an embodiment in detail. In a first variant (FIG. 6a), the coupling hinge and connecting hinge distances b, c each amount to one quarter of the articulation point spacing, or the length of a car unit a, so that the length of the guide and carrier units 8, 10 between the respective hinges is identical and amounts in each case to half the length of a car unit a. This embodiment achieves the maximum reduction of the polygon effect.

Apart from that, it results in the advantage that two identical load-bearing members can be disposed on one car. FIG. 9 shows such an arrangement by way of example. In the sorting conveyor illustrated there, both the guide units 8 and the carrier units 10 each support a load-bearing member 40 which, in the example illustrated, takes the form of a transverse rib member (transverse rib conveyor). If carrying buckets are contemplated here, they may be designed as tilting buckets in a known manner.

In the arrangement illustrated in FIG. 9, the spaces between two adjacent transverse rib members 40 are closed by overlapping covers 42. The covers 42 reach beneath an adjacent load-bearing member in the way indicated by dashed lines, so that even in bends, no gaps arise between the load-bearing members. Thanks to the arrangement of two load-bearing members which are identical in size, the gaps on a car can be kept to a minimum. Compared to a sorter with a conventional construction, in which two identical bearing members are arranged on two conventional cars, the construction according to FIGS. 6a and 9 makes it possible to reduce the number of components, especially also the bearing and guide rollers, offering not only a cost benefit, but also a reduction in the running noises.

The construction according to FIG. 6a makes it possible to reduce the number of components, especially also the bearing and guide rollers, offering not only a cost benefit, but also a reduction in the running noises.

Alternatively, in the construction according to FIG. 6a, a single support member per car may be provided, which, depending on what is more excpedient, may be fixed either to the carrier unit or to the guide unit.

FIG. 6b shows one variant of an embodiment, in which the coupling hinge and the connecting hinge are each disposed on a connecting line between two guide rollers which are opposite each other in the cross-direction. This embodiment provides the advantage that the articulation points, namely the coupling hinge and the connecting hinge, only deviate to a minimal extent from the centre line of the sorter frame bend, i.e. the centre between the bearing tracks 34 of the guide rails 6. The tensile forces prevailing in the sorter chain stabilise the car in its orientation within the track.

FIG. 6c shows a further variant, in which the two articulation points, namely the coupling hinge and the connecting hinge, coincide in one point, preferably on the axis of rotation 16a of the idlers. With this embodiment too, the polygon effect can be reduced in comparison to a car of conventional design. Furthermore, the coincidence of the articulation points enables the number of components to be reduced.

In all the variants of the embodiments, it is possible to arrange the coupling hinges 12 and/or the connecting hinges 26 at the same height as the guide rollers 18. As a result, the lateral force that arises in horizontal bends and is caused by the tensile or compressive forces present in the chain of cars does not—or only to a minimal extent—lead to a tilting moment acting on the car, thus preventing the idlers from lifting off from the running rail and bumping into an upper lift-off guard. Wear and noise caused by this are avoided.

Studies have shown that the polygon effect and the concomitant disadvantages are distinctly reduced when the construction of the invention is used for a sorting conveyor as compared to a chain of cars where the cars have a rigid frame, in which the idlers are arranged as trailing end runners. This is explained in FIG. 7, which illustrated the influence of the car geometry on the polygon effect.

The guide units and the carrier units may have top sides on the same height above the bearing track 34, so that it is easier to position the load-bearing members in virtually any position on the car.

Since the longitudinal expansion because of temperature fluctuations is not inconsiderable in large systems, the running rails and the members absorbing tensile forces in the cars forming the sorter chain are made from materials with coefficients of longitudinal expansion which are as far as possible identical, ideally the same material, e.g. steel or aluminium. The point is that different degrees of longitudinal expansion of the running rail and the sorter chain would lead to changes in the chain tension set, which would have a negative influence on the running behaviour and especially the noise and wear. The frame of the guide unit may be made from alternative materials, e.g. also plastic. The tensile force from the coupling hinge to the connecting hinge is then, where applicable, conducted through an additional component penetrating the guide unit, which ahs the same material properties as the guide rails.

In a preferred embodiment (FIG. 8), in order to introduce propulsion or drive forces and thus to move the car, flat reaction parts 50, or 50a, b, e.g. sheets of aluminium, are attached vertically and centrally on the guide and/or carrier units. These do not contribute to transmitting the tensile force prevailing in the sorter chain. The reaction parts are connected in such a way that when they heat up because of the drive system, e.g. linear drive or friction wheels, they can expand without any effect on the structural components of the car which absorb tensile/compressive forces.

As FIG. 8 also shows, the gaps between mutually adjacent reaction parts of adjacent cars, which are needed in order to allow travel round horizontal and vertical bends are designed in such a way that the contours that determine the length have a substantially constant radius about the articulation point of the adjacent connecting hinge. In the region of a coupling hinge, there is a straight, vertical gap because of the vertical swivelling axis. With this embodiment, the dimensions of the gap and hence the breaks which are relevant for the drive system can be kept to a minimum.

FIG. 8a shows a variant of an embodiment corresponding to FIG. 6a with articulation points of coupling and connecting hinges spaced relatively far apart from one another. A good solution in this case is to provide two reaction parts 50a, b, one of them under the guide unit 8 and one under the carrier unit 10, facing each other in the region of the coupling hinge with a vertical gap. In the region of the connecting hinges 26, circular contours with a circular ring-shaped gap between them are contemplated, as described above.

With a construction in accordance with FIG. 6b or 6c (FIGS. 8b, c), it is sufficient for a reaction part 50 to be disposed only beneath the carrier unit, since its ends only swing out a little to the side when travelling round bends, provided that, with a construction in accordance with FIG. 6b, the carrier unit is of considerably greater length than the guide unit (coupling hinge and connecting hinge distances b, c are relatively small compared to the length of a car unit a). In FIG. 2, where an arrangement in accordance with FIG. 8b is illustrated, the reaction parts 50 can likewise be seen.

| List of reference numerals | |
|---|---|
| 2 | Car |
| 4 | Track |
| 6 | Running rail |
| 8 | Guide unit |
| 10 | Carrier unit |
| 12 | Coupling hinge |
| 12a | Swivelling axis |
| 14 | Car body |
| 16 | Idler |
| 16a | Axis of rotation |
| 18 | Guide roller |
| 18a | Axis of rotation |
| 20 | Direction of conveyance |
| 26 | Connecting hinge |
| 28 | Vertical axis |
| 30 | Transverse axis |
| 32 | Longitudinal axis |
| 34 | Bearing track |
| 36 | Guide track |
| 40 | Load-bearing member (transverse rib member; carrying bucket) |
| 42 | Cover |
| 50 | Reaction part |
| 50a, b | Reaction part |
| a | Distance between articulation points (length of a car unit) |
| b | Coupling hinge distance |
| c | Connecting hinge distance |
| d | Guide roller distance |
| e | Transverse spacing |

The invention claimed is:

1. A sorting conveyor with a series of cars linked together in an articulated way, which are guided and capable of travelling along a track, and each of which cars has a guide unit and a carrier unit linked to the guide unit in an articulated way, each two adjacent cars being connected to each other by connecting the guide unit of one of the adjacent cars with the carrier unit of the other one of the adjacent cars,
    wherein each guide unit has, in matching longitudinal positions on each side, an idler for co-operating with the track, and
    wherein each idler has associated with it two guide rollers, a first one of which is disposed in a first longitudinal position spaced apart in front of the respective idler and a second one of which is disposed in a second longitudinal position spaced apart behind the respective idler,
    wherein between the guide unit and the carrier unit of each car there is disposed a coupling hinge which is pivotable about a swivelling axis aligned perpendicularly to a plane of the track, and between adjacent cars there is disposed a connecting hinge which is rotatable in each direction, and
    wherein the connecting hinge and the coupling hinge are each disposed in longitudinal positions out-side an area between the first and second longitudinal positions of the guide rollers.

2. The sorting conveyor as claimed in claim 1, characterised in that the connecting hinge and the coupling hinge of each guide unit are arranged in longitudinal positions at equal distances from the longitudinal position of the idlers and are spaced apart by a first distance from one another, and the connecting hinge and hinge of each carrier unit are spaced apart from one another by a distance identical to the first mutual spacing.

3. The sorting conveyor as claimed in claim 1, characterised in that the idlers of a guide unit are rotatable about a common horizontal axis.

4. The sorting conveyor as claimed in claim 1, characterised in that the guide rollers are rotatable about vertical axes of rotation.

5. The sorting conveyor as claimed in claim 1, characterised in that the guide rollers of a guide car are disposed spaced apart by a longitudinal distance which is smaller than a transverse spacing perpendicular to the direction of conveyance.

6. The sorting conveyor as claimed in claim 1, characterised in that the guide rollers of the guide unit are arranged at substantially the same height as the connecting hinge, so that in horizontal bends, lateral forces resulting from tensile forces do not lead to tilting moments acting on the car.

7. The sorting conveyor as claimed in claim 1, characterised in that the guide rollers of a guide unit are arranged at substantially the same height as the axes of rotation of the idlers.

8. The sorting conveyor as claimed in claim 1, characterised in that the guide units and/or the carrier units possess a reaction part for transmitting drive forces.

9. The sorting conveyor as claimed in claim 8, characterised in that the reaction part takes the form of a stator or a drive part of a linear motor, wherein the respective other drive element is disposed in or is formed by the track.

10. The sorting conveyor as claimed in claim 9, characterised in that the reaction parts take the form of flat components aligned vertically and in the direction of conveyance, the ends of which facing in the direction of conveyance being rounded in the shape of a segment of a circle in the region of a connecting hinge and forming a narrow gap to an adjacent reaction part.

11. The sorting conveyor as claimed in claim 1, characterised in that at least one load-bearing member is disposed on each car.

12. The sorting conveyor as claimed in claim 11, characterised in that the load-bearing members are mechanically or electrically actuated tilting members or transverse rib members.

13. The sorting conveyor as claimed claim 11, characterised in that each car is equipped with two load-bearing members, one of which is disposed on the guide unit and one on the carrier unit.

14. The sorting conveyor as claimed in claim 1 wherein the idler is weight bearing and each idler supports a proportional weight of the car.

15. The sorting conveyor as claimed in claim 1 wherein the idler on each side and its respective guide rollers are arranged such that the idler can be supported by the track and horizontal forces from the same track are opposed by the respective guide rollers.

16. The sorting conveyor as claimed in claim 1 wherein the idlers of a single guide unit have a common axis of rotation and their respective guide rollers are guided by the track such that the common axis of rotation is aligned through a center point of a curve when the guide unit moves through a curve.

17. The sorting conveyor as claimed in claim 1 wherein the guide rollers are guided by the track and thereby guide the guide unit so that the idlers are always aligned with the direction of travel when the conveyor is traveling through curves in the track.

18. A sorting conveyor with a series of cars linked together in an articulated way, which are guided and capable of travelling along a track, and each of which cars has a guide unit and a carrier unit linked to the guide unit in an articulated way, each two adjacent cars being connected to each other by connecting the guide unit of one of the adjacent cars with the carrier unit of the other one of the adjacent cars, wherein each guide unit has, in matching longitudinal positions on each side, an idler for co-operating with the track, and wherein each idler has associated with it two guide rollers, a first one of which is disposed in a first longitudinal position spaced apart in front of the respective idler and a second one of which is disposed in a second longitudinal position spaced apart behind the respective idler, wherein between the guide unit and the carrier unit of each car there is disposed a coupling hinge which is pivotable about a swivelling axis aligned perpendicularly to a plane of the track, and between adjacent cars there is disposed a connecting hinge which is rotatable in each direction, and wherein the connecting hinge and the coupling hinge are disposed in a matching longitudinal position centrally between the first and second longitudinal positions of the guide rollers.

19. The sorting conveyor as claimed in claim 18, characterised in that the idlers of a guide unit are rotatable about a common horizontal axis.

20. The sorting conveyor as claimed in claim 18, characterised in that the guide rollers are rotatable about vertical axes of rotation.

21. The sorting conveyor as claimed in claim 18, characterised in that the guide rollers of a guide car are disposed spaced apart by a longitudinal distance which is smaller than a transverse spacing perpendicular to the direction of conveyance.

22. The sorting conveyor as claimed in claim 18, characterised in that the guide rollers of the guide unit are arranged at substantially the same height as the connecting hinge, so that in horizontal bends, lateral forces resulting from tensile forces do not lead to tilting moments acting on the car.

23. The sorting conveyor as claimed in claim 18, characterised in that the guide rollers of a guide unit are arranged at substantially the same height as the axes of rotation of the idlers.

24. The sorting conveyor as claimed in claim 18, characterised in that the guide units and/or the carrier units possess a reaction part for transmitting drive forces.

25. The sorting conveyor as claimed in claim 18, characterised in that at least one load-bearing member is disposed on each car.

26. The sorting conveyor as claimed in claim 18 wherein the idler is weight bearing and each idler supports a proportional weight of the car.

27. The sorting conveyor as claimed in claim 18 wherein the idler on each side and its respective guide rollers are arranged such that the idler can be supported by the track and horizontal forces from the same track are opposed by the respective guide rollers.

28. The sorting conveyor as claimed in claim 18 wherein the idlers of a single guide unit have a common axis of rotation and their respective guide rollers are guided by the track such that the common axis of rotation is aligned through a center point of a curve when the guide unit moves through a curve.

29. The sorting conveyor as claimed in claim 18 wherein the guide rollers are guided by the track and thereby guide the guide unit so that the idlers are always aligned with the direction of travel when the conveyor is traveling through curves in the track.

30. A sorting conveyor with a series of cars linked together in an articulated way, which are guided and capable of travelling along a track, and each of which cars has a guide unit and a carrier unit linked to the guide unit in an articulated way, each two adjacent cars being connected to each other by connecting the guide unit of one of the adjacent cars with the carrier unit of the other one of the adjacent cars, wherein each guide unit has, in matching longitudinal positions on each side, an idler for co-operating with the track, and wherein each idler has associated with it two guide rollers, a first one of which is disposed in a first longitudinal position spaced apart in front of the respective idler and a second one of which is disposed in a second longitudinal position spaced apart behind the respective idler, wherein between the guide unit and the carrier unit of each car there is disposed a coupling hinge which is pivotable about a swivelling axis aligned perpendicularly to a plane of the track, and between adjacent cars there is disposed a connecting hinge which is rotatable in each direction, and wherein the connecting hinge is disposed in the first or second longitudinal position of the guide rollers, and the coupling hinge is disposed in the respective other, second or first, longitudinal position.

31. The sorting conveyor as claimed in claim 30, characterised in that the idlers of a guide unit are rotatable about a common horizontal axis.

32. The sorting conveyor as claimed in claim 30, characterised in that the idlers guide rollers are rotatable about vertical axes of rotation.

33. The sorting conveyor as claimed in claim 30, characterised in that the guide rollers of a guide car are disposed spaced apart by a longitudinal distance which is smaller than a transverse spacing perpendicular to the direction of conveyance.

34. The sorting conveyor as claimed in claim 30, characterised in that the guide rollers of the guide unit are arranged at substantially the same height as the connecting hinge, so that in horizontal bends, lateral forces resulting from tensile forces do not lead to tilting moments acting on the car.

35. The sorting conveyor as claimed in claim 30, characterised in that the guide rollers of a guide unit are arranged at substantially the same height as the axes of rotation of the idlers.

36. The sorting conveyor as claimed in claim 30, characterised in that the guide units and/or the carrier units possess a reaction part for transmitting drive forces.

37. The sorting conveyor as claimed in claim 30, characterised in that at least one load-bearing member is disposed on each car.

38. The sorting conveyor as claimed in claim 30 wherein the idler is weight bearing and each idler supports a proportional weight of the car.

39. The sorting conveyor as claimed in claim 30 wherein the idler on each side and its respective guide rollers are arranged such that the idler can be supported by the track and horizontal forces from the same track are opposed by the respective guide rollers.

40. The sorting conveyor as claimed in claim 30 wherein the idlers of a single guide unit have a common axis of rotation and their respective guide rollers are guided by the track such that the common axis of rotation is aligned through a center point of a curve when the guide unit moves through a curve.

41. The sorting conveyor as claimed in claim 30 wherein the guide rollers are guided by the track and thereby guide the guide unit so that the idlers are always aligned with the direction of travel when the conveyor is traveling through curves in the track.

42. A sorting conveyor with a series of cars linked together in an articulated way, which are guided and capable of travelling along a track, and each of which cars has a guide unit and a carrier unit linked to the guide unit in an articulated way, each two adjacent cars being connected to each other by connecting the guide unit of one of the adjacent cars with the carrier unit of the other one of the adjacent cars, wherein each guide unit has, in matching longitudinal positions on each side, a corresponding first idler and a corresponding second idler for co-operating with the track, and wherein each respective first idler has associated with it a first pair of guide rollers, a first one of which is disposed in a first longitudinal position spaced apart in front of the respective first idler and a second one of which is disposed in a second longitudinal position spaced apart behind the respective first idler, wherein each respective second idler has associated with a second pair of guide rollers different from the first pair, wherein one of the second pair of guide rollers is disposed in a first longitudinal position spaced apart in front of the respective second idler and wherein the other of the second pair of guide rollers is disposed in a second longitudinal position spaced apart behind the respective second idler, wherein between the guide unit and the carrier unit of each car there is disposed a coupling hinge which is pivotable about a swivelling axis aligned perpendicularly to a plane of the track, and between adjacent cars there is disposed a connecting hinge which is rotatable in each direction, and wherein the connecting hinge and the coupling hinge are each disposed in longitudinal positions out-side an area between the first and second longitudinal positions of the guide rollers.

43. The sorting conveyor as claimed in claim 42 wherein the idler is weight bearing and each idler supports a proportional weight of the car.

44. The sorting conveyor as claimed in claim 42 wherein the idler on each side and its respective guide rollers are arranged such that the idler can be supported by the track and horizontal forces from the same track are opposed by the respective guide rollers.

45. The sorting conveyor as claimed in claim 42 wherein the idlers of a single guide unit have a common axis of rotation and their respective guide rollers are guided by the track such that the common axis of rotation is aligned through a center point of a curve when the guide unit moves through a curve.

46. The sorting conveyor as claimed in claim 42 wherein the guide rollers are guided by the track and thereby guide the guide unit so that the idlers are always aligned with the direction of travel when the conveyor is traveling through curves in the track.

\* \* \* \* \*